United States Patent [19]

Shimada

[11] Patent Number: 5,737,093
[45] Date of Patent: Apr. 7, 1998

[54] RECORDING DATA GENERATING DEVICE HAVING OUTPUT ALLOWANCE/PREVENTION MODE

[75] Inventor: Yasuo Shimada, Nagoya, Japan

[73] Assignee: Brother Kogyo Kabushiki Kaisha, Nagoya, Japan

[21] Appl. No.: 440,925

[22] Filed: May 15, 1995

[30] Foreign Application Priority Data

May 13, 1994 [JP] Japan ................................ 6-124422

[51] Int. Cl.⁶ ........................................ H04N 1/415
[52] U.S. Cl. ............................. 358/433; 358/432
[58] Field of Search ........................ 358/432–433, 358/458–459, 456, 465, 466; 395/112, 114–117

[56] References Cited

U.S. PATENT DOCUMENTS

| 3,804,975 | 4/1974 | Abe | 358/432 |
|---|---|---|---|
| 5,073,966 | 12/1991 | Sato | 358/459 |
| 5,452,104 | 9/1995 | Lee | 358/433 |
| 5,479,165 | 12/1995 | Nakayama | 358/432 |
| 5,555,511 | 9/1996 | Ooi | 395/114 |
| 5,608,654 | 3/1997 | Matsunoshita | 395/114 |

FOREIGN PATENT DOCUMENTS

A-62-248667  10/1987  Japan.

*Primary Examiner*—Edward L. Coles, Sr.
*Assistant Examiner*—Stephen Brinich
*Attorney, Agent, or Firm*—Oliff & Berridge, P.L.C.

[57] ABSTRACT

To record image data in increased number of gradations while forming a unitary data with a small number of dots, two lines worth of image dot data are transferred to shift registers from an image dot data memory. Unitary data of 2-by-2 dot matrix data framed by a window are sequentially read from the shift registers while shifting the window in a main-scanning direction. The unitary data is converted to 16-bit recording data. A set mode register has an output prevention mode and an output allowance mode. When the output prevention mode is set, the recording data is not outputted with regard to one of the two dot lines.

18 Claims, 7 Drawing Sheets

FIG. 4

| SELECT SIGNAL | RECORD. DATA (Hex) |
|---|---|
| 0 | 0 0 0 0 |
| 1 | 8 0 0 0 |
| 2 | C 0 0 0 |
| 3 | E 0 0 0 |
| 4 | F 0 0 0 |
| 5 | F 8 0 0 |
| 6 | F C 0 0 |
| 7 | F E 0 0 |
| 8 | F F 0 0 |
| 9 | F F 8 0 |
| A | F F C 0 |
| B | F F E 0 |
| C | F F F 0 |
| D | F F F 8 |
| E | F F F C |
| F | F F F F |

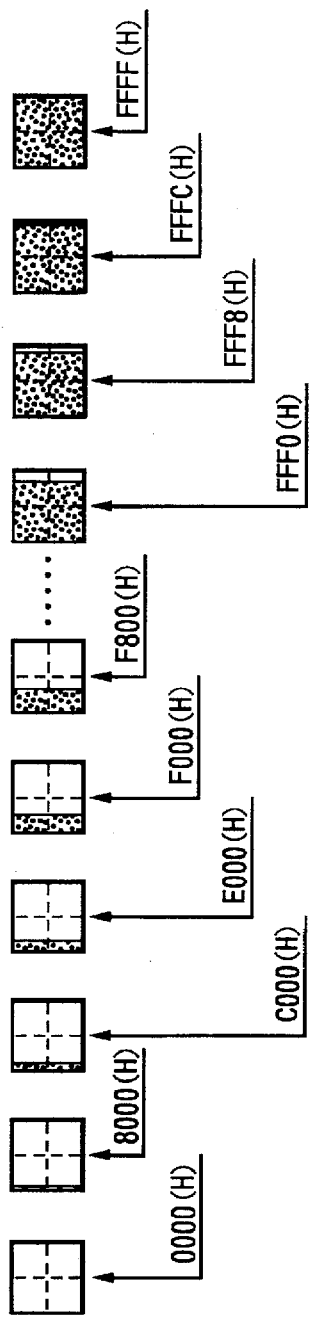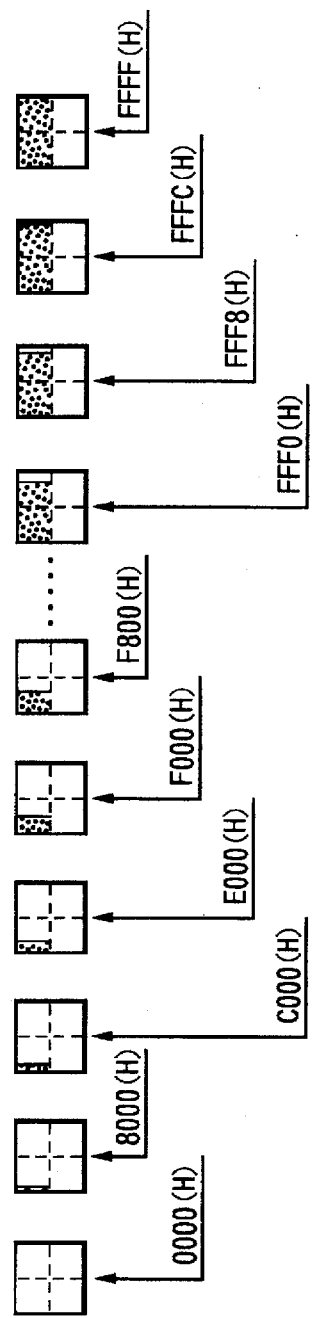

5,737,093

1

RECORDING DATA GENERATING DEVICE HAVING OUTPUT ALLOWANCE/ PREVENTION MODE

BACKGROUND OF THE INVENTION

1. Field of the Invention

The present invention relates to a recording data generating device for use, for example, in a laser printer. More particularly, the invention relates to a recording data generating device wherein the number of gradations in the recorded image is artificially increased when the image is recorded by way of area gradation.

2. Description of the Related Art

Image data read from a document by an image scanner or image data produced by an image data producing device is sent to a laser printer or the like to print an image. In In printing the image, the time duration at which the laser beam is turned ON is controlled based on a recording data pattern corresponding to a unitary data which may be, for example, a 2-by-2 dot matrix, two dots aligned in adjacent columns on the same dot line extending in the main scanning direction and another two dots aligned in the same columns but on the subsequent dot line. The image is recorded on a recording sheet by changing a print density for each unitary data. With a unitary data of 2-by-2 dot matrix, 16 gradations are available when printing the image. With a unitary data of 3-by-3 dot matrix, 512 gradations are available when printing the image.

Japanese Laid-Open Patent Publication (Kokai) No. HEI-62-248667 proposes an improved half-tone image recording wherein to attain an increased number of gradations 8-by-8 dot matrix is used and to attain high resolution of the image 4-by-4 dot matrix and 8-by-8 dot matrix are selectively used depending on the number of recording dots. Because adjacent recording dots do not merge together, gradation in high density recording area is improved.

As described, when the unitary data is formed from a small number of dots, images are printed in a small number of gradations. For example, when each unitary data is formed from four dots or six dots, images can be printed in only 16 or 64 gradations, respectively. Increase of the number of dots forming each unitary data, for example, increase to 64 dots with 8-by-8 dot matrix, can increase the number of gradations. However, the increase of the number of dots forming each unitary data also increases the number of recording data patterns which need to be provided corresponding to the number of gradations expressed by the unitary data. Further, the decoder circuit for decoding the unitary data is enlarged in size, and a larger control unit must be used.

SUMMARY OF THE INVENTION

In view of the foregoing, it is an object of the present invention to provide a recording data generating device capable of artificially increasing the number of gradations in recording an image while forming a unitary data with a small number of dots.

To achieve the above and other objects, there is provided a recording data generating device which includes data storing means for storing a plurality of lines' worth of dot line data. The dot line data is representative of dots arranged in columns of a dot line extending in a main-scanning direction. A data buffer is provided for receiving M lines's worth of dot line data from the data storing means and storing M-by-N dot matrix data as a unitary data. N represents a number of columns to be framed on the dot line and M represents a number of dot lines to be framed in an auxiliary-scanning direction perpendicular to the main-scanning direction. M is 2 or 3 and N is 2 or 3. Data reading means is provided for sequentially reading the unitary data from the data buffer while shifting the framed columns in the main-scanning direction. Data conversion means is provided for converting the unitary data to recording data for printing in positions corresponding to framed columns and framed dot lines. In the invention, output prevention means is provided for preventing the recording data from being outputted with regard to at least one of the framed dot lines.

A mode setting means is further provided for selectively setting an output prevention mode and an output allowance mode. The output prevention means is operable when the output prevention mode is set in the mode setting means. The mode setting means outputs a first signal when the output prevention mode is set and a second signal when the output allowance mode is set. The output prevention means includes gating means having a first input applied with the recording data from the data conversion means and a second input applied selectively with the first signal and the second signal. The recording data is prevented from passing through the gating means when the first signal is applied to the second input of the gating means whereas the recording data is allowed to pass through the gating means when the second signal is applied to the second input of the gating means.

Due to the provision of the output prevention means, the density of the upper or lower halves, or ⅓ or ⅔ of the upper or lower half, of M dot lines is recorded at "0".

BRIEF DESCRIPTION OF THE DRAWINGS

The above and other objects, features and advantages of the invention will become more apparent from reading the following description of the preferred embodiment taken in connection with the accompanying drawings in which:

FIG. 4 is a schematic view showing a correspondence between recording data and 16 types of select signal stored in a conversion data register of the control system;

FIG. 7 is a graphical representation of pixels recording at different densities while the laser printer is in an output allowance mode; and FIG. 8 is a graphical representation of pixels recording at different densities while the laser printer is in an output prevention mode.

DETAILED DESCRIPTION OF THE PREFERRED EMBODIMENT

A preferred embodiment of the present invention will be described while referring to the accompanying drawings, wherein the invention is applied to a laser printer 1 which performs printing based on image data transmitted from a personal computer. Printing is performed by scanning a laser beam in a main-scanning direction in a manner to be described later.

Figure 1:
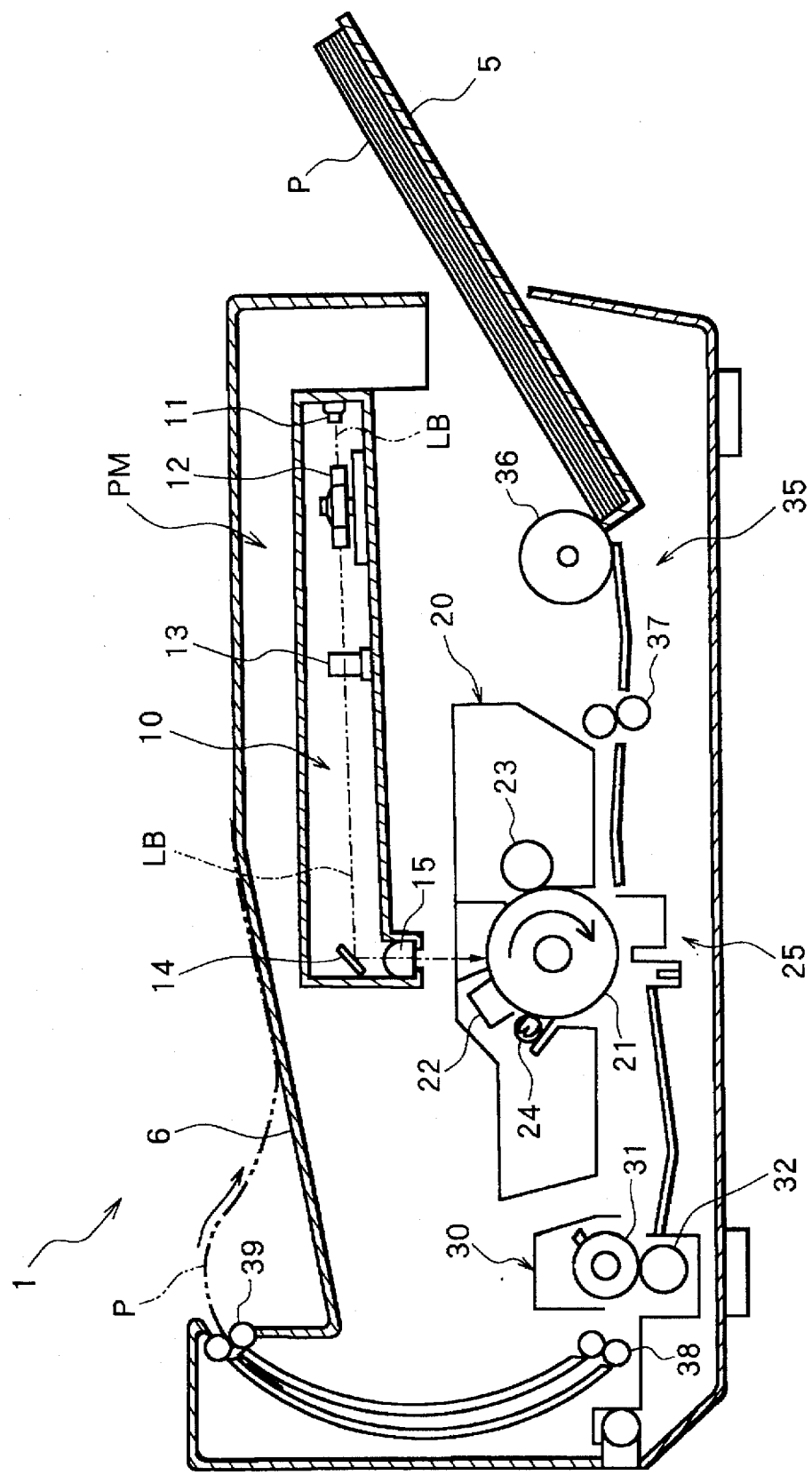
FIG. 1 is a cross-sectional view showing a laser printer according to an embodiment of the present invention.

As shown in FIG. 1, a printing mechanism PM of the printer 1 includes a laser scanner 10; a process cartridge 20; a transfer/separation device 25 having a discharger needle and a transfer charger; a fixing unit 30 having a fixing roller 31 and a pressure roller 32; and a sheet transport unit 35 having a registration roller 37, a feed roller 38 and a discharge roller 39. The laser scanner 10 includes a semiconductor laser 11, a hexagonal polygon mirror 12, a condensing lens 13, a reflection mirror 14, and a lens 15 made from a synthetic resin. The process cartridge 20 contains a photosensitive drum 21, a primary charger 22, a developing cylinder 23, and an exposure lamp 24.

The printing mechanism PM also includes other electrical components such as a main motor for driving the photosensitive drum 21 are various rollers in the transport unit 35, and a fixing heater for the fixing roller 31.

In operation, the semiconductor laser 11 emits a laser beam LB which falls incident on the hexagonal polygon mirror 12. Because the hexagonal polygon mirror 12 is rotating at a fixed speed, the laser beam LB is deflected across a predetermined angle with each mirror surface. In this way, the laser beam LB is scanned in a main-scanning direction. After passing through the condensing lens 13, the deflected laser beam LB is reflected downward off the reflection mirror 14 so as to pass through the lens 15 and irradiate the peripheral surface of the rotating photosensitive drum 21, where an electrostatic latent image is formed.

The latent image formed on the photosensitive drum 21 is developed into a visible image with toner supplied from the developing cylinder 23. The visible image is transferred onto a printing sheet P transported from a sheet supply cassette 5 by the transport unit 35. The printing sheet P with an image recorded thereon is transported through the fixing unit 30 and, via the rollers 38 and 39, onto the discharge tray 6.

Figure 2:
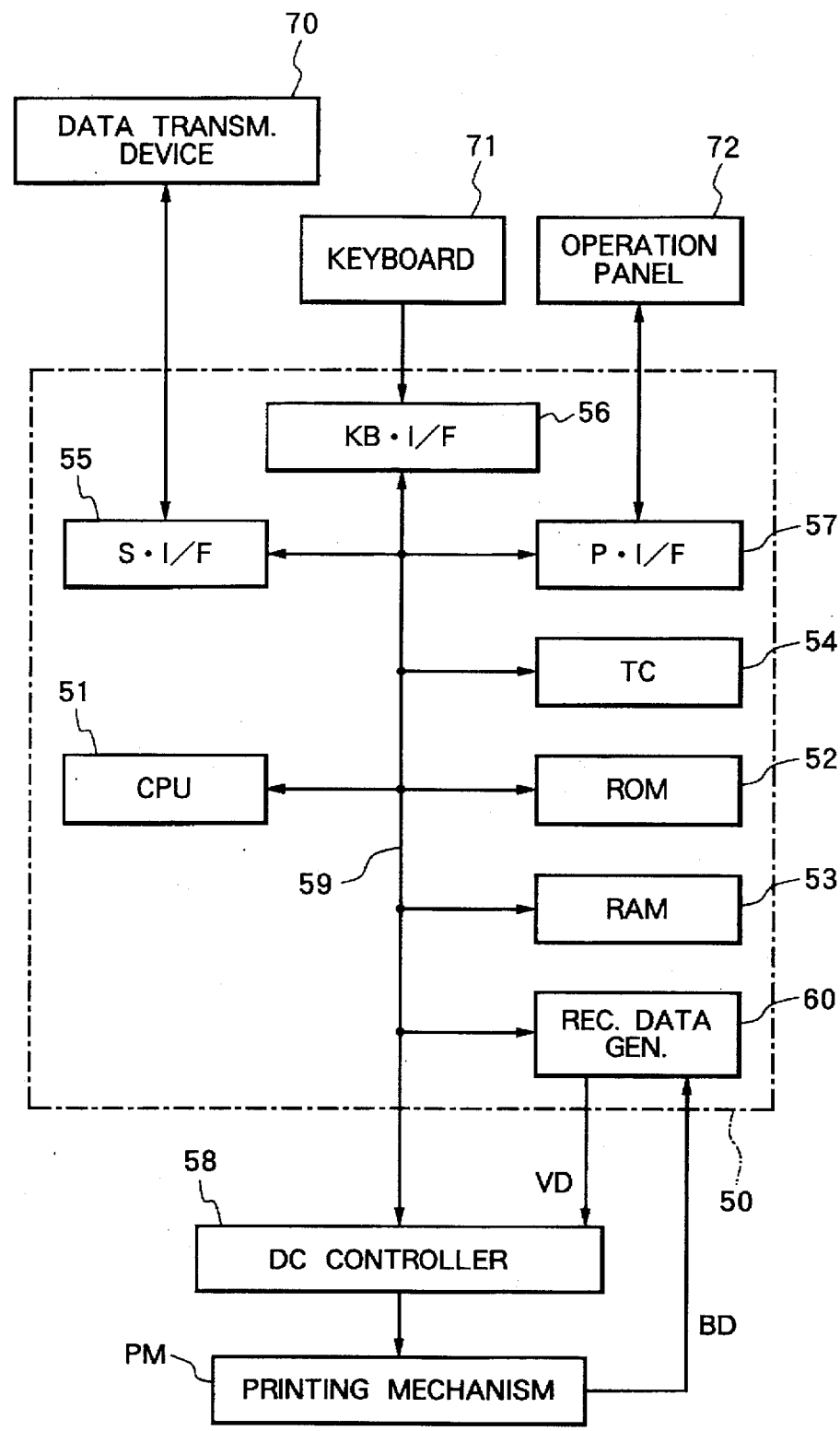
FIG. 2 is a block diagram showing configuration of a control system for the laser printer of FIG. 1.

Next, the control system of the laser printer 1 will be described while referring to the block diagram of FIG. 2. The control system of the laser printer 1 is basically the same as that of a conventional laser printer, so will be described here only briefly.

A video controller 50 of the laser printer 1 includes a CPU 51; a ROM 52 storing various control programs; a RAM 53; timing clock generation circuit (TC) 54 for generating various clock pulse signals such as a video clock signal VDCLK and a recording clock signal PCLK; a serial interface (S I/F) 55 for receiving image data transmitted from the data transmission device 70; keyboard interface (KB I/F) 56 for receiving key depression signals from the keyboard 71; a panel interface (P I/F) 57 for receiving signals from the operation panel 72; and a recording data generation circuit 60 (to be described later), all connected to the CPU 51 by a BUS 59 such as a data BUS.

A DC controller circuit 58 is designed for controlling the main motor which rotates the photosensitive drum 21 and various rollers in the transport unit 35; the fixing heater for the fixing roller 31; the scanner motor for driving the hexagonal polygon mirror 12; and the semiconductor laser 11. A horizontal synchronization signal BD is produced at the start of each scan of the laser beam LB in the main-scanning direction, and is applied to the recording data generation circuit 60.

The RAM 53 is provided with various memories such as a reception data buffer for receiving and storing image data transmitted from the data transmission device 70 which may be a personal computer or a host computer; an image dot data memory 53a for storing image dot data used in printing processes; and a various buffers for temporarily storing results of calculations performed by the CPU 51.

The ROM 52 stores various control programs normally provided for controlling laser printers. The ROM 52 also stores a DMA control program for controlling a direct memory access (DMA) controller (see FIG. 3).

Figure 3:
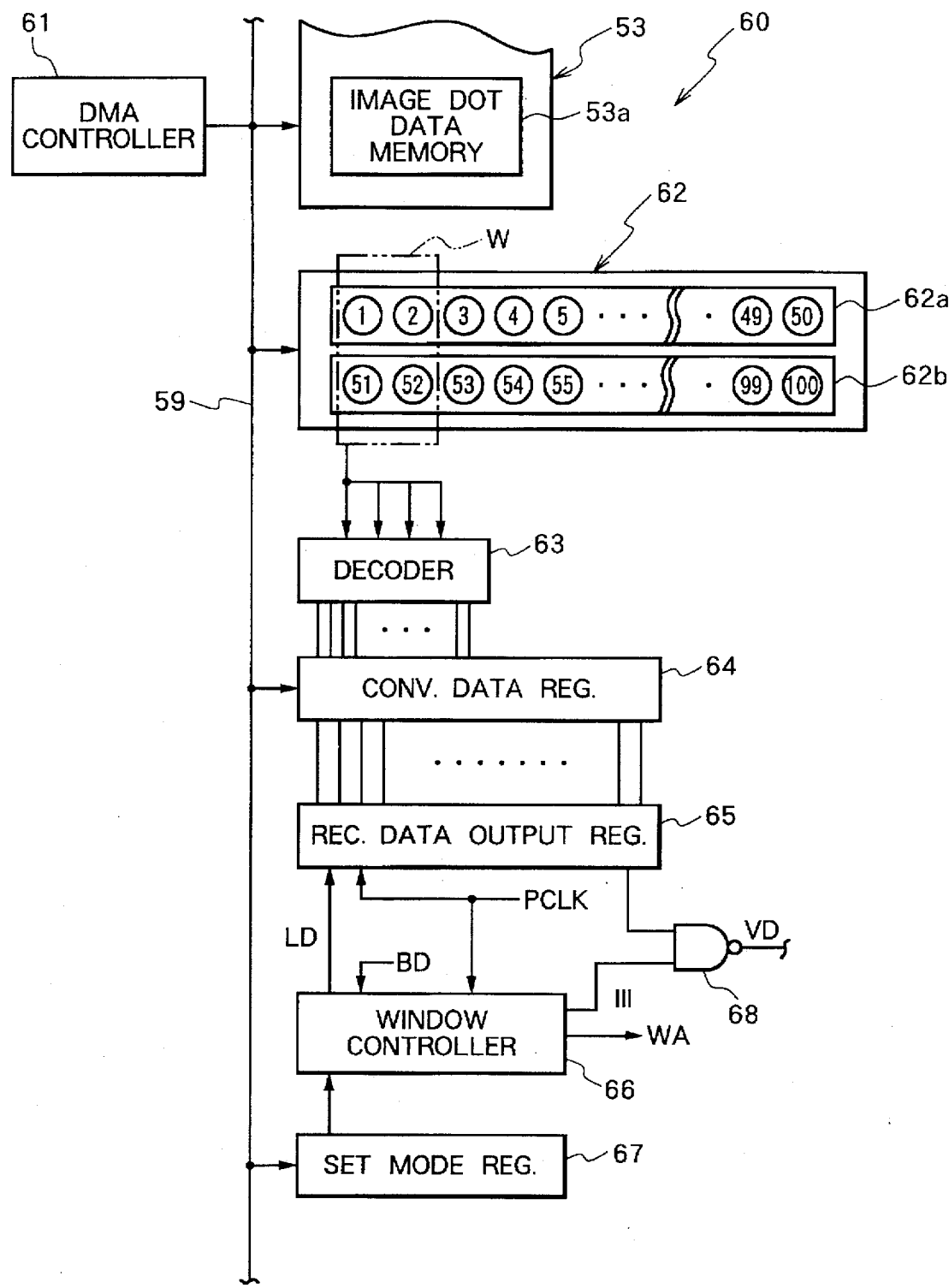
FIG. 3 is a block diagram showing configuration of a recording data generation circuit of the control system of FIG. 2.

Next, the recording data generating circuit 60 will be described while referring to FIG. 3. The recording data generating circuit 60 includes a DMA controller 61; a shift register 62; a conversion data register 64 preloaded with recording data (see FIG. 4) in correspondence with 16-bit select signal outputted from a decoder 63; and a set mode register 67, all connected to the BUS 59. The shift register 62 has a first shift register 62a and a second shift register 62b each for storing one line's worth of dot data of the image dot data stored in the image dot data memory 53a of the RAM 53. The conversion data register 64 converts a 16-bit select signal outputted from the decoder 63 to its corresponding recording data. The set mode register 67 has an output prevention mode and an output allowance mode to be described in detail hereinafter.

Next, operation of the recording data generating circuit 60 as controlled by the DMA controller 61 will be described. First, one line's worth of image dot data of, for example, 50 bits (represented by numbers "1" through "50") is retrieved from the image dot data memory 53a and transferred to the first shift register 62a according to the DMA function. Likewise, subsequent one lines's worth of image dot data (represented by numbers "51" through "100") are transferred to the second shift register 62b. In this embodiment, image recording data for two adjacent columns in two adjacent dot lines are generated based on unitary data of 2-by-2 dots which frames the image dot data in the subject locations. More specifically, to generate the image recording data for the first and second columns on the first dot line and the image recording data for the first and second columns on the second dot line, the window controller 66 controls a window W (see FIG. 3) to frame the corresponding image dot data "1", "2", "51" and "52". The framed image dot data is used as a unitary data for generating the image recording data. The image dot data "1" and "2" are retrieved from the first shift register 62a and the image dot data "51" and "52" are retrieved from the second shift register 62b.

These four pieces of image dot data, i.e., those identified by "1", "2", "51" and "52" are decoded by the decoder 53. The decoder 63 supplies 16-bit select signal to the conversion data register 64. The recording data stored in the conversion data register 64 in correspondence with 16 types of select signal (see FIG. 4) indicates the timing and the duration at which the laser beam LB should be turned ON. The conversion data register 64 outputs the recording data that corresponds to the 16-bit select signal.

Figure 5:
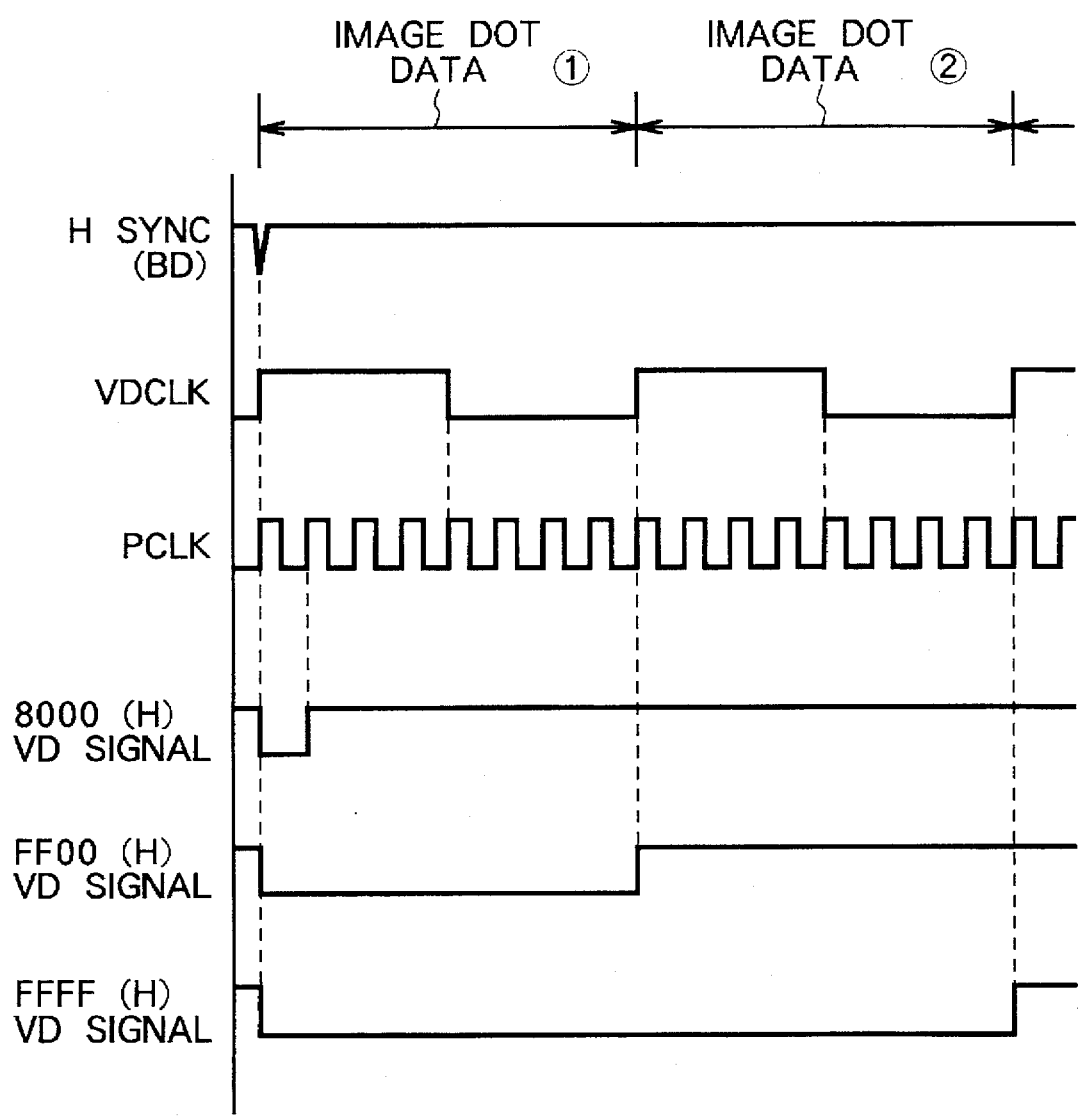
FIG. 5 is a timing chart showing relationship between various clock signals and video signals.

Each time when the load signal LD, which is generated in accordance with the movement of the window W as controlled by the window controller 66, is received at the recording data output register (shift register) 65, the latter outputs a low level video signal VD in synchronization with the recording clock signal PCLK through a NAND gate 68. For example, when the recording data is "8000(H)" as shown in FIG. 5, a video signal VD with low level duration corresponding to the first one of 16 recording clock signals PCLK is outputted to the semiconductor laser 11. When the recording data is "FF00(H)", a video signal VD with low level duration corresponding to the first eight recording clock signals PCLK is outputted to the semiconductor laser 11. When the recording data is "FFFF(H)", a video signal VD with low level duration corresponding to the entire 16 recording clock signals PCLK is outputted to the semiconductor laser 11.

The window controller 66 includes an address counter for controlling the window W to sequentially shift in the main-scanning direction, and a counter for counting a number of horizontal synchronization signals BD generated each time when the laser beam LB performs one scan in the main-scanning direction. The window controller 66 outputs a window address WA for shifting the window W. The window controller 66 outputs to the NAND gate 68 an output prevention signal IH either at a high-level to prevent output of recording data or at a low-level to allow output of recording data. When the set mode register 67 is set to the output allowance mode, the window controller 66 outputs a low-level output prevention signal IH. When the output prevention mode is set in the set mode register 67, the window controller 66 outputs a low-level output prevention signal IH during odd-numbered scans and outputs a high-level output prevention signal IH during even-numbered scans. The NAND gate 68 outputs a low-level video signal VD when receiving input of a low-level output prevention signal IH, but is prevented from outputting a video signal VD when receiving input of a high-level output prevention signal IH. The commands to set the laser printer 1 into the output prevention mode or the output allowance mode can be either inputted beforehand via the keyboard 71 or included in the image data received from the data transmission device 70.

Figure 6:
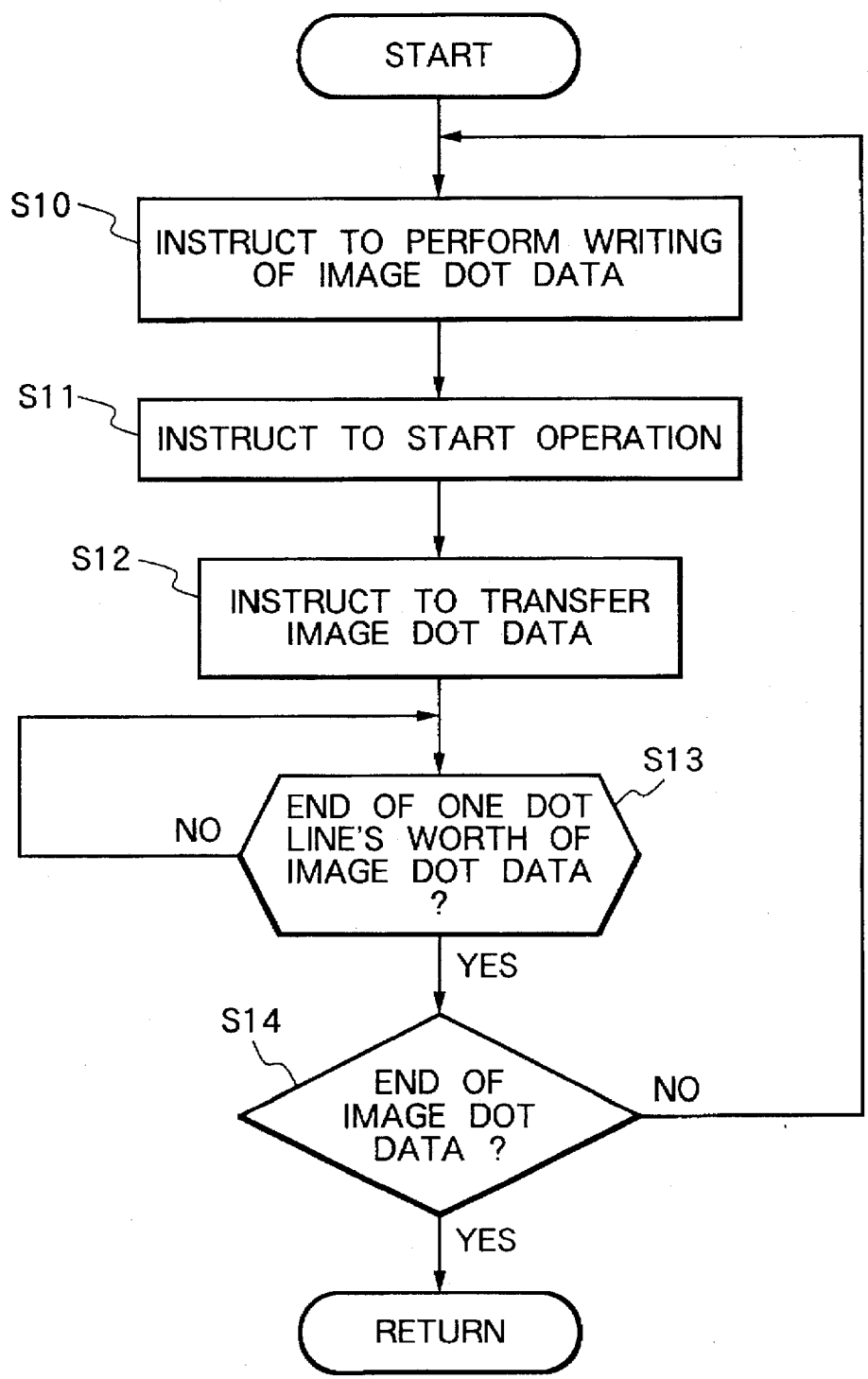
FIG. 6 is a flowchart showing a recording data generation control routine.

Next, the recording data generation control routine performed by the video controller 50 of the laser printer 1 will be described while referring to the flowchart in FIG. 6 where steps of the flowchart will be referred to as Si, wherein i is the number of the individual step. This routine starts when image data is received from the data transmission device 70 and finally image dot data in a form usable by the printing mechanism PM is stored in the image dot data memory 53a. In S10, the CPU 51 first instructs the DMA controller 61 to perform writing of image dot data and also supplies thereto information, such as the write address and the length of the data to be written according to the recording control program in the ROM 52. Next, the DMA controller 61 is commanded to start operation in S11. In S12, a command is outputted to start transfer of image dot data. As a result, the first line's worth of the image dot data stored in the image dot data memory 53a is transferred to the first shift register 62a and the second line's worth of the image dot data is transferred to the second shift register 62b.

Then processes of the DMA controller 61 are executed. A window W is set according to the window address WA from the window controller 66. Four bits of data corresponding to the unitary data framed by the window are supplied to the decoder 63. The 16 bits of data decoded by the decoder 63 are supplied to the conversion data register 64. The 16-bit recording data outputted from the conversion data register 64, which data corresponds to the unitary data, is supplied to the recording data output register 65. At a time when the load signal LD is received, the recording data output register 65 outputs a low level video signal VD to the NAND gate 68 in synchronization with the recording clock signal PCLK. It will be assumed here that the output allowance mode is set in the set mode register 67 so that the window controller 66 outputs a low-level output prevention signal IH to the NAND gate 68.

Recording data corresponding to numbers "1", "2", "51" and "52" of the four-dot unitary data framed by the window W is first subjected to processing to generate a video signal VD to be used in corresponding positions framed by the window W. Next, recording data corresponding to numbers "3", "4", "53" and "54" is subjected to processing to generate a video signal VD to be used in corresponding positions. The video signal VD is produced and outputted in this manner until no image dot data remains in the first shift register 62a.

During the second scan of the laser beam LB, recording data corresponding to the numbers "1", "2", "51", and "52" of the unitary data framed by the window W is outputted as the video signal VD in regards to the numbers "51" and "52" of the image dot data in the second shift register 62b and recording data corresponding to the numbers "3", "4", "53", and "54" of the unitary data framed by the window W is outputted as the video signal VD in regards to the numbers "53" and "54" of the image dot data. The video signal VD is outputted in this manner until no image dot data remains in the second shift register 62b.

In other words, the same video signal VD is outputted for the same columns in successive two scans in the main-scanning direction, resulting in the tonal patterns shown in FIG. 7. Therefore, the tonal area that corresponds to the unitary data will be recorded only about 1/16 black during the first and second scans when the video signal VD represents the "8000(H)" recording data. When the video signal VD represents the "FFFF (H)" recording data, the tonal area that corresponds to the unitary data is recorded totally black in both the first scan and the second scans.

When the window controller 66 outputs a high-level output prevention signal IH when the output prevention mode is set in the set mode register 67. The high-level output prevention signal IH causes to prevent the low-level recording data from being outputted from the NAND gate 68 during even-numbered scans. In the output prevention mode, a video signal VD is outputted during odd-numbered scans but not during even-numbered scans. Therefore, as shown in FIG. 8, the tonal area that corresponds to the unitary data is recorded black only about 1/16 during the first scan only when the video signal VD represents the "8000(H)" recording data. In the same manner, the tonal area is recorded totally black during the first scan only when the video signal VD represents the "FFFF (H)" recording data. Images are therefore recorded at half the density of those recorded when the laser printer 1 is in the output allowance mode so that the tonal areas become artificially thinner. Although artificially produced, the number of gradations is greatly increased.

When two scans of image dot data in the shift register 62 are recorded, the DMA controller 61 outputs a signal to the CPU 51 to indicate that one dot line's worth of data has been recorded. This produces a YES determination in S13 of the recording data generation control routine, whereupon whether or not recording processes have been completed for all the image dot data is determined in S14. If not (i.e., B14 is NO), the program returns to S10, whereupon S10 through S14 are repeatedly executed until all the image dot data has been recorded. When all the image dot data has been recorded (i.e., S14 is YES), the routine is completed and the program returns to the main routine.

As described above, when the one line's worth of data representing the second of two lines is prevented from being outputted, the lower half of recorded images corresponding to the unitary data (two line's worth of recording data) are recorded at a "0" density so that the recorded portion is decreased. Therefore, the total number of gradations, including those produced when output of recording data is not prevented, can be artificially increased.

Because the laser printer 1 is designed so that the output prevention mode and the output allowance mode can be selected using the keyboard 71 or image data, image data can be optionally recorded at normal density, at an overall lower density, or at a combination of these by selecting the output allowance mode or the output prevention mode.

While the invention has been described in detail with reference to specific embodiments thereof, it would be apparent to those skilled in the art that various changes and modifications may be made therein without departing from the spirit of the invention, the scope of which is defined by the attached claims.

For example, the data unit can be set by a window W that frames three lines by three columns, two lines by three columns, or three lines by two columns. When the window W is set to frame three lines by three columns or three lines by two columns, the laser printer 1 can be designed so that output of one or two of the three line's worth of recording data to be recorded can be selectively prevented according to an indication by the set mode register 67.

Also, output of recording data for the upper of two lines could be prevented, and output of recording data for the lower line could be allowed, during the output prevention mode.

The present invention can be applied to recording data generation devices of various printers that include reception data buffers, intermediate buffers, and print mechanisms for recording transmitted image data with each raster scan in a main scanning direction.

What is claimed is:

1. A recording data generating device comprising:
   data storing means for storing a plurality of lines' worth of dot line data and for dividing the plurality of lines' worth of dot line data into M-by-N dot matrix data, the dot line data being representative of dots arranged in columns of a dot line extending in a main-scanning direction;
   a data buffer for receiving M line's worth of dot line data from said data storing means and storing each of the M-by-N dot matrix data as separate unitary data wherein N represents a number of columns to be framed on the dot line and M represents a number of dot lines to be framed in an auxiliary-scanning direction perpendicular to the main-scanning direction, wherein M is 2 or 3 and N is 2 or 3;
   data reading means for sequentially reading each of the unitary data from said data buffer while shifting the framed columns in the main-scanning direction;
   data conversion means for converting each of the unitary data to recording data for printing in positions corresponding to framed columns and framed dot lines; and
   output prevention means for preventing the recording data from being outputted with regard to only one or two of the framed dot lines when M is 3 and one of the framed dot lines when M is 2.

2. A recording data generating means according to claim 1, further comprising mode setting means for selectively setting an output prevention mode and an output allowance mode, wherein said output prevention means is operable when the output prevention mode is set in said mode setting means.

3. A recording data generating means according to claim 2, wherein said mode setting means outputs a first signal when the output prevention mode is set and a second signal when the output allowance mode is set, and wherein said output prevention means comprises gating means having a first input applied with the recording data from said data conversion means and a second input applied selectively with the first signal and the second signal, the recording data is prevented from passing through said gating means when the first signal is applied to the second input of said gating means whereas the recording data is allowed to pass through said gating means when the second signal is applied to the second input of said gating means.

4. A recording data generating device according to claim 3, further comprising recording means for producing an inked region on a recording sheet in accordance with the recording data.

5. A recording data generating device according to claim 4, wherein said recording data has a low level duration, during which said recording means produces the inked region, wherein said gating means comprises a NAND gate, and wherein the first signal is a low level signal and the second signal is a high level signal.

6. A recording data generating device according to claim 5, wherein recording means comprises a semiconductor laser emitting a laser beam, said semiconductor laser being subjected to on-off control based on the recording data.

7. A recording data generating device according to claim 1, wherein said data reading means comprises decoding means for decoding each of the unitary data and outputting a select signal to said data conversion means, said data conversion means converting each of the unitary data to recording data in accordance with the select signal.

8. A recording data generating device according to claim 1, wherein said data storing means comprises a plurality of shift registers each storing each of the plurality of lines' worth of dot line data.

9. A recording data generating device comprising:
   a first shift register storing one line's worth of dot line data, the dot line data being representative of dots arranged in columns of a dot line extending in a main-scanning direction;
   a second shift register storing one line's worth of dot line data in a succeeding dot line;
   window means for dividing two lines' worth of dot line data stored in said first shift register and said second shift register into 2-by-2 dot matrix data and for storing each of the 2-by-2 dot matrix data as a unitary data, each of the unitary data framing two successive columns in two successive dot lines;
   decoding means for receiving each of the unitary data from said window means and decoding the unitary data to output a select signal;
   data conversion means for converting each of the unitary data into recording data for printing in positions corresponding to framed columns and framed dot lines by said window means; and
   output prevention means for preventing the recording data from being outputted in only one of the positions in a framed area.

10. A recording data generating means according to claim 9, further comprising window controlling means for controlling said window means to sequentially shift in the main-scanning direction while skipping two columns.

11. A recording data generating means according to claim 9, further comprising mode setting means for selectively setting an output prevention mode and an output allowance mode, wherein said output prevention means is operable when the output prevention mode is set in said mode setting means.

12. A recording data generating means according to claim 11, wherein said mode setting means outputs a first signal when the output prevention mode is set and a second signal when the output allowance mode is set, and wherein said output prevention means comprises gating means having a first input applied with the recording data from said data conversion means and a second input applied selectively with the first signal and the second signal, the recording data is prevented from passing through said gating means when the first signal is applied to the second input of said gating means whereas the recording data is allowed to pass through said gating means when the second signal is applied to the second input of said gating means.

13. A recording data generating device according to claim 12, further comprising recording means for producing an inked region on a recording sheet in accordance with the recording data.

14. A recording data generating device according to claim 13, wherein said recording data has a low level duration, during which said recording means produces the inked region, wherein said gating means comprises a NAND gate, and wherein the first signal is a low level signal and the second signal is a high level signal.

15. A recording data generating device according to claim 14, wherein said recording means comprises a semiconductor laser emitting a laser beam, said semiconductor laser being subjected to on-off control based on the recording data.

16. A recording data generating device according to claim 9, wherein said window means stores 2-by-3 dot matrix data as separate unitary data, each of the unitary data framing three successive columns in two successive dot lines.

17. A recording data generating device according to claim 9, further comprising a third shift register storing one line's worth of dot line data in a dot line succeeding to the dot line in said second shift register, and wherein said window means stores 3-by-2 dot matrix data as separate unitary data, each of the unitary data framing two successive columns in three successive dot lines.

18. A recording data generating device according to claim 17, wherein said window means stores 3-by-3 dot matrix data as separate unitary data, each of the unitary data framing three successive columns in three successive dot lines.

* * * * *